Jan. 20, 1942.  J. C. KARNES  2,270,307
DETECTOR FOR INVISIBLE RADIATION
Filed May 21, 1940
Fig-1-
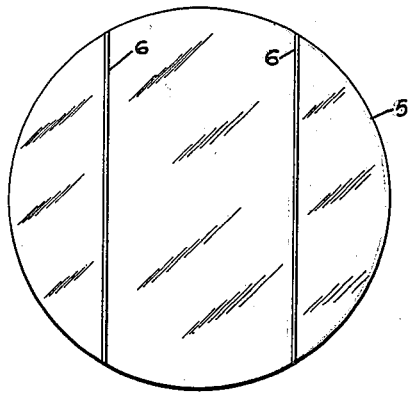
Fig-2-
Fig-3-
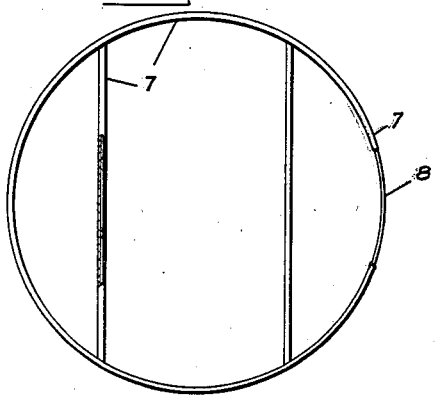
Fig-4-
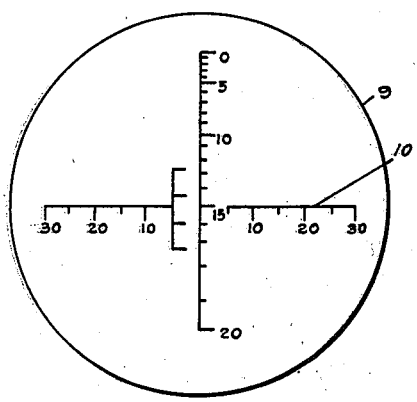
Inventor
James C. Karnes
By G J Kessenich + J H Church
Attorneys Patented Jan. 20, 1942

2,270,307

UNITED STATES PATENT OFFICE 2,270,307

DETECTOR FOR INVISIBLE RADIATION

James C. Karnes, Buffalo, N. Y.

Application May 21, 1940, Serial No. 336,412

5 Claims. (Cl. 250—71)

(Granted under the act of March 3, 1883, as amended April 30, 1928; 370 O. G. 757)

The invention described herein may be manufactured and used by or for the Government for governmental purposes, without the payment to me of any royalty thereon.

The subject of this invention is a detector for invisible radiation.

It has been proposed, as in U. S. Patent 1,385,657, to conduct signalling, aiming and other military operations by projecting a directed beam of invisible rays onto a fluorescent screen for the purpose of avoiding detection by an enemy.

The purpose of this invention is to provide means for permitting the visual detection of such invisible radiations which may readily be incorporated into an element such as the lens, prism or reticle glass of an optical instrument.

The specific nature of the invention as well as other objects and advantages thereof will clearly appear from a description of a preferred embodiment as shown in the accompanying drawing in which:

Fig. 1 is a view in front elevation of a lens constructed in accordance with the invention;

Fig. 2 is a view in side elevation;

Fig. 3 is a view showing the application to a grid;

Fig. 4 is a view showing a scale reticle.

Referring to Figs. 1 and 2 there is shown a lens 5 adapted to form an element of an optical instrument. On the plane face of the lens there are provided one or more narrow lines or bands 6 composed of fluorescent material and applied in any convenient manner. When the lens is interposed in the path of invisible radiation the bands will fluoresce and provide positive indication to the observer that a source of invisible radiation is on the prolongation of the axis of the optical instrument.

In Fig. 3 the fluorescent material 7 is placed as a coating on the wire 8 which is formed as a grid capable of being placed on or adjacent to an element of an optical instrument such as the lens 5.

In Fig. 4 a reticle scale such as is used in military binoculars is provided on a transparent body or glass plate 9 in the usual manner and the small grooves constituting the lines of the reticle are filled with fluorescent material 10 to any desired degree which is capable of fluorescing in the manner previously described. When the instrument is used for normal observation the fluorescent material serves merely to emphasize the lines of the reticle and does not interfere with vision in the major portion of the field.

A reticle of fluorescent material also has application to an instrument of the type shown in my prior U. S. Patent 2,171,571 in which a source of illumination such as an incandescent lamp is employed to provide a luminous reticle.

I claim:

1. In an optical instrument a reticle of substantially non-self-luminous fluorescent material capable of detecting the presence of invisible radiation within the normal visible field of view of said instrument.

2. In an optical instrument having a field of view for normal observation of an external object field by means of visible radiation, a reticle comprising a body of non-self-luminous fluorescent material unresponsive to said visible radiation but responsive to invisible radiation within said field of view, whereby the presence of invisible radiation external to said instrument may be detected.

3. In an optical instrument having a field of view for the normal observation of an external object field by means of visible radiation, a detector for detecting the presence of invisible radiation within said object field, said detector comprising a body of fluorescent material responsive to said invisible radiation associated with the said instrument and occupying a portion of its field of view.

4. In an optical instrument having a field of view for the normal observation of an external object field by means of visible radiation, a detector for detecting the presence of invisible radiation within said object field, said detector comprising a body of material unresponsive to said visible radiation but responsive to said invisible radiation associated with the said instrument and occupying a portion of its field of view.

5. In an optical instrument of the telescope type having a field of view for a normal observation of an external object field by means of visible radiation, a detector for detecting the presence of a source of invisible radiation within said object field, said detector comprising a reticle of non-self-luminous fluorescent material unresponsive to said visible radiation but responsive to said invisible radiation within said field of view.

JAMES C. KARNES.